Figure 1:
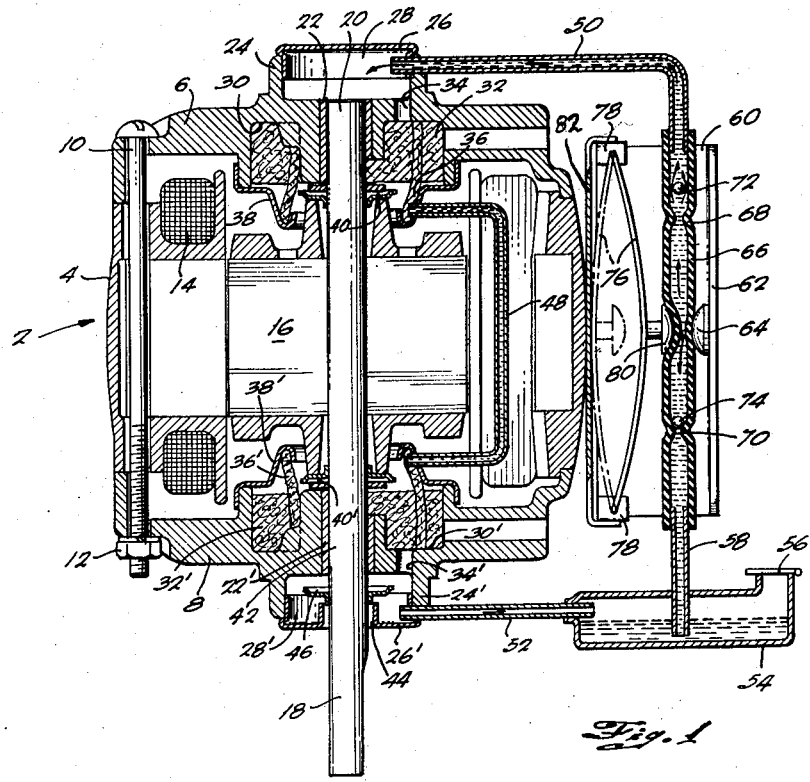

Nov. 25, 1958   J. M. SMALL   2,861,652
LUBRICATION SYSTEM AND PUMP THEREFOR
Filed July 1, 1954

INVENTOR
JOSEPH M. SMALL
BY
James and Franklin
ATTORNEYS.

United States Patent Office 2,861,652
Patented Nov. 25, 1958

2,861,652

LUBRICATION SYSTEM AND PUMP THEREFOR

Joseph M. Small, Owosso, Mich., assignor, by mesne assignments, to Controls Company of America, Schiller Park, Ill., a corporation of Delaware Application July 1, 1954, Serial No. 440,681

18 Claims. (Cl. 184—6)

The present invention relates to a lubrication system for rotative machinery in which the heat developed in the motor is relied upon to power a pump which supplies lubrication to the machine. The invention further relates to specific details of the pump thus utilized.

The use of a pump-actuated circulating lubrication system in an electric motor or the like is not new. However, since over-lubrication is often as serious a problem as under-lubrication, the rate of flow of lubricant through such a system need not be great and usually must be very slight. To power a lubricant pump from the output shaft of the motor is per se quite simple mechanically, but to provide such a pump which will furnish lubricant at the requisite very low rate is not nearly so easy a problem, not only because of the expense involved in providing mechanism to step down the motor output to a sufficient degree, but also because the pumps themselves tend not to operate properly when actuated very slowly. In addition, to power the pump from the output shaft necessarily involves a lessening of the other useful work which the motor can perform. Where step-down gearing is employed, with a consequent appreciable frictional loss, the loss in the effective output of the motor will be considerable.

The present invention provides for a closed lubrication system including a pump which has the desired operating characteristics and which is powered by energy derived from the motor without, however, in any way reducing the useful output of the motor. According to the present invention the pump is actuated by the heat produced in the motor as an inevitable consequence of the operation thereof. This heat represents waste energy which is usually dissipated without performing any useful function. The present invention utilizes this dissipated heat to provide for forced lubrication feed.

Moreover, the arrangement of the pump of the present invention is such that although it provides for flow of lubricating fluid at a very low rate, nevertheless its parts are so designed that, when they are active, they move sufficiently rapidly as to produce effective pumping action. Of course, the period of time during which those parts are actively movable is very small compared with the period of time during which they are stationary, and hence the overall rate of feed is sufficiently low as to eliminate any danger from over-lubrication.

The apparatus of the present invention is entirely automatic, operates only when the motor is in use, requires no adjustment or supervision, and is particularly adapted for use with small electric motors designed to operate for extended periods of time in remote or inaccessible locations where they are not available for periodic manual lubrication. The invention is, of course, likewise useable with other types of electric motors, with generators or alternators, and with other types of equipment, electric and otherwise.

The pump has an actuating element which is positioned in sufficient proximity to the motor to be operatively effected by the heat developed in the motor and to be powered thereby. As here specifically disclosed, it takes the form of a bimetal strip, preferably of the snap action type, known per se. The strip, when cooled, is close to and preferably in heat-conductive contact with the motor. As the temperature of the strip increases and finally reaches a critical value, the strip will snap to its heated position more remote from the motor. In that position the heat of the motor will not affect it as intensively, it will tend to cool, and after its temperature has fallen a predetermined amount it will snap back to its initially described cooled position closer to the motor. This cycle will continue for as long as the motor is in operation, the duration of the dwell periods between movement of the strip from one of its positions to the other being determined by the design of the strip, its position relative to the motor, and the amount of heat generated in the motor. The strip is mechanically operatively connected to a pump so as to cause the pump to operate when the strip moves. As here disclosed the pump is in the form of a small deformable rubber tube having simple check valves at opposite ends thereof, the movement of the strip from its cooled position close to the motor to its heated position remote from the motor compressing the tube and forcing fluid out therefrom, movement of the strip back to its cooled position permitting the tube to expand and thus suck a new supply of fluid thereinto.

In order to facilitate the operation of the bimetal strip, it has been found desirable to interpose a sheet of metal foil such as aluminum or the like between the bimetal strip and the motor, that foil functioning as an efficient heat conductor between the motor and the strip when the strip is in its cooled position, at which time the strip preferably physically engages the foil sheet, that sheet acting as a heat insulator between the motor and the strip when the strip is in its heated position so as to hasten the cooling thereof.

Figure 2:
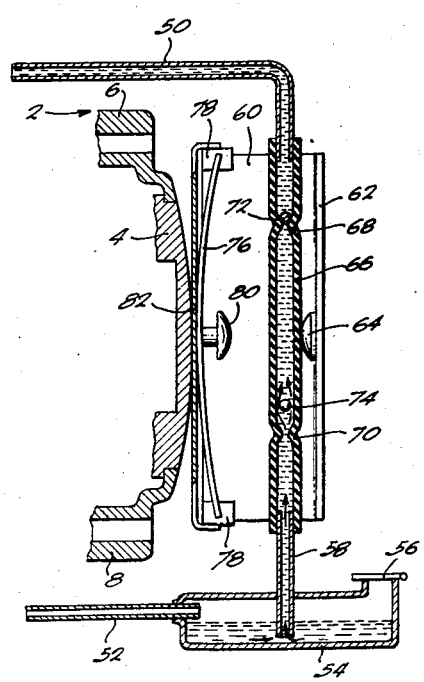

To the accomplishment of the above, and to such other objects as may hereinafter appear, the present invention relates to a lubrication system and to a heat-powered pump specially adapted to be used therein, as defined in the instant claims, and as described in this specification, taken together with the accompanying drawings, in which:

Fig. 1 is a cross sectional view of an embodiment of the present invention as used to lubricate an electric motor, the bimetal strip being shown in solid lines in its heated position and in broken lines in its cooled position; and Fig. 2 is a fragmentary view similar to Fig. 1 but showing the bimetal strip in its cooled position.

As has been mentioned, the present invention is specially adapted for use in conjunction with the small electric motors, and is specifically illustrated in conjunction with the motor generally designated 2, that motor comprising a central casing 4 having end caps 6 and 8 secured thereto by means of screws 10 and nuts 12. The central casing 4 carries a field structure 14 within which a rotor 16 is rotatable, that rotor being mounted on output shaft 18. The upper end 20 of the shaft 18 is journalled in bearing bushing 22 carried by the end cap 6, the upper portion of that end cap 6 having a flange 24 provided with a cover 26 and defining an oil-receiving chamber 28. An annular recess 30 is formed in the underside of the end cap 6 and is filled with absorbent packing material 32, an aperture 34 being provided through which lubricant can flow from the oil-receiving chamber 28. A wick 36 may depend from the absorbent material 32 into an oil catching ring 38 fixed to the end cap 6, the shaft 18 being provided with a slinger ring 40 if desired.

The lower portion 42 of the shaft 18 is journalled within a bearing bushing 22' carried by the lower end cap 8, there being elements on and in connection with the shaft portion 42 and the lower end cap 8 corresponding to the elements 24-40 just described, the reference numerals for the corresponding elements at the lower end of the motor being primed. The cover 26' which closes the bottom of the lubricant receiving chamber 28' has an opening 44 through which the operating end of the shaft 18 projects, that shaft having a slinger ring 46 mounted therein within the chamber 28' so as to prevent oil from escaping through the opening 44.

A pipe 48 communicates between the rings 38 and 38'. An inlet pipe 50 enters the upper oil receiving chamber 28. A pipe 52 communicates between the lower oil receiving chamber 28' and a sump tank 54 provided with a cap 56 through which lubricant may be introduced into the tank. A pipe 58 extends upwardly from the sump tank 54, its lower end being immersed in the lubricating fluid within the tank.

A supporting bracket 60 is mounted adjacent the motor in any appropriate manner, that bracket having a flange 62 carrying an inwardly extending abutment 64. A resilient flexible tube 66 of oil resistent rubber or plastic material is connected between the pipes 50 and 58 and extends parallel to the flange 62, its outer edge engaging the abutment 64. It is provided with upper and lower narrowed portions 68 and 70 respectively, balls 72 and 74 being positioned above the narrowed portions 68 and 70 respectively so as to function as check valves.

A bimetal strip 76, preferably of the snap action type, and known per se, is mounted between lips 78 carried by the bracket 60 adjacent the motor 2 and between the motor 2 and the tube 66. The strip 76 carries a button-like abutment 80 positioned opposite the abutment 64, the tube 66 being positioned between the abutments 80 and 64.

The bimetal strip 76, when its temperature is below a predetermined value, will assume the position shown in broken lines in Fig. 1 and in solid lines in Fig. 2, and when its temperature has exceeded that predetermined value it will move to the position shown in solid lines in Fig 1. The former position will be termed its cooled position and the latter position its heated position. As will be apparent from the drawings, when the strip 76 is in its cooled position it will be closer to the motor 2 than when it is in its heated position. Moreover, when the bimetal strip is in its heated position the abutment 80 will approach closer to the abutment 64 than the normal thickness of the tube 66, thus causing that tube to be compressed and reducing its effective volume. When the strip 76 is in its cooled position the abutment 80 will be moved away from the abutment 64 and, as here specifically disclosed, completely out of engagement with the tube 66, thus permitting that tube to expand and increasing its effective volume. When the strip 76 is in its cooled position it is preferably in heat-conductive relation to the motor 2, so that the heat developed in the motor through the operation thereof will be effective to cause the temperature of the strip 76 to rise. When the strip 76 is in its heated position more remote from the motor 2, it will not be as affected by the heat emanating from the motor 2, and therefore will tend to cool until the temperature has fallen sufficiently for it to snap back to its cooled position.

In order to make the temperature of the strip 76 more sensitive to the heated and cooled positions thereof, that is to say, in order to assist the strip in cooling when in its heated position, it has been advantageous to interpose between the strip 76 and the motor 2 a sheet 82 of metal foil such as aluminum, that sheet being an effective conductor of heat and also an effective reflector of heat. The central portion of the sheet 82 bears against the motor 2 and the strip 76, when in cooled position, directly bears against the sheet 82. Consequently, when the strip 76 is in its cooled position, it is in heat-conductive relationship with the motor 2, and will be heated thereby in a reasonably efficient manner. When, however, the strip 76 has moved to its heated position it will no longer be in contact with the sheet 82, and that sheet, because of its heat-reflective properties, will to some extent shield the bimetal strip 76 from the heat emanating from the motor 2, thus facilitating the cooling of the strip 76 and its return to its cooled position.

When the strip 76 moves to its heated position, as shown in the solid lines in Fig. 1, it will, as aforesaid, compress the tube 66. This tube initially being filled with lubricating fluid, and the action of the ball check valves 72 and 74 being as disclosed, some of the lubricating fluid between those ball check valves will be forced upwardly into the tube 50 and, via that tube, into the upper lubricating chamber 28 of the motor 2. When the strip 76 then returns to its cooled position, as shown in Fig. 2, the consequent expansion of the tube 66 will cause lubricating fluid to be sucked thereinto via the tube 58 and past the lower check valve 74.

This sequence will continue for as long as the motor is operating. The rate of pumping of lubricating fluid will be determined by the design of the strip 76 and particularly the temperature at which it will snap from one of its positions to the other, and the extent to which the volume of the tube 66 is altered as between those two positions of the strip 76, as well as by the amount of heat emanating from the motor. By changing the relative positions of the strip 76 and the tube 66, or by modifying the design of the unit, almost any rate of flow of lubricant can be provided, between one or two drops per hour and several drops per minute for units designed for use with small electric motors.

Of course, after lubricant has been pumped into the upper chamber 28 of the motor 2, it will eventually, via the pipe 48, find its way back down into the lower lubricant chamber 28', from which it will return to the sump 54 by gravity flow through the tube 52.

It is significant that the lubrication system of the present invention is operative to feed lubricant to the motor only when the motor is operated, and this entirely automatically. It is further noteworthy that the power for the pumping action is derived from energy which is ordinarily wasted, to wit, the heat inescapably produced in the motor during operation thereof, and hence the motor functions without in any way detracting from the useful power derivable from the output shaft 18. Moreover, the hotter the motor runs the more rapidly will lubricant be fed thereto, this being inherent in the design of the lubrication system, and it is precisely when the motor is running at a higher temperature than normal that increased lubrication is usually desired. Hence the lubrication system of the present invention is not only automatic, but provides for optimum lubrication independently of the speed at which the motor is operated. The system has but a minimal number of moving parts, and all of its parts are extremely inexpensive standard units purchasable as such or readily fabricatable on a mass production basis. The heat-powered pump which is employed in the system will therefore be seen to have applicability apart from the system, while at the same time defining an inexpensive and positively operating pump especially useable, because of its size, dependability and low cost, for the lubrication of small electric motors.

While but a single embodiment of the present invention has been here disclosed, it will be apparent that many variations may be made therein, all within the spirit of the invention as defined in the following claims.

I claim:

1. A heat-powered pump comprising a readily flexible tube with check valves at the exit and inlet ends thereof, said valves opening in exit and inlet directions respectively, a support on one side of said tube between said valves and engageable with said tube, and a snap-type bimetal strip operatively connected to said tube opposite said support and movable with snap action between heated and cooled positions in accordance with the temperature thereof, said strip when in cooled position being more remote from said tube than when in heated position, said strip when moving from cooled to heated position compressing said tube against said support, thereby expelling material from said tube via its exit end, and said strip when moving from heated to cooled position permitting said tube to expand, thereby causing material to enter said tube via its inlet end.

2. In a motor lubrication system comprising a motor, a source of lubricating fluid, a pump, and fluid passage connections between said source and said motor via said pump; the improvement which comprises a bimetal strip operatively connected to said pump for operating the latter and positioned in sufficient proximity to said motor to be operatively affected by the heat developed in said motor, said strip being movable in accordance with the temperature thereof between heated and cooled positions, thereby causing said pump to operate, said strip in its heated position being more remote from said motor than in its cooled position.

3. In a motor lubrication system comprising a motor, a source of lubricating fluid, a pump, and fluid passage connections between said source and said motor via said pump; the improvement which comprises a snap-type bimetal strip operatively connected to said pump for operating the latter and positioned in sufficient proximity to said motor to be operatively affected by the heat developed in said motor, said strip being movable in accordance with the temperature thereof between heated and cooled positions, thereby causing said pump to operate, said strip in its heated position being more remote from said motor than in its cooled position.

4. In a motor lubrication system comprising a motor, a source of lubricating fluid, a pump, and fluid passage connections between said source and said motor via said pump; the improvement which comprises said pump comprising a flexible tube with check valves at the exit and inlet ends thereof, said valves opening in exit and inlet directions respectively, a bimetal strip operatively connected to said tube and movable in accordance with the temperature thereof between heated and cooled positions, thereby respectively compressing said tube and permitting said tube to expand, said strip being positioned in sufficient proximity to said motor to be operatively affected by the heat developed in said motor, said strip in its heated position being more remote from said motor than in its cooled position.

5. The motor lubrication system of claim 4, in which said bimetal strip when in cooled position is in heat-conductive contact with said motor.

6. In the motor lubrication system of claim 4, a sheet of metal foil interposed between said motor and said bimetal strip.

7. In the motor lubrication system of claim 4, a sheet of metal foil interposed between said motor and said bimetal strip, said foil sheet being in heat-conductive contact with said motor and said bimetal strip when in cooled position being in heat-conductive contact with said foil sheet.

8. In combination with the pump of claim 1, a heating source on the side of said strip opposite said tube, said strip when in cooled position being in heat-conductive contact with said source.

9. In combination with the pump of claim 1, a heating source on the side of said strip opposite said tube, and a sheet of metal foil interposed between said heating source and said strip.

10. In combination with the pump of claim 1, a heating source on the side of said strip opposite said tube, and a sheet of metal foil interposed between said heating source and said strip, said strip when in cooled position being in heat-conductive contact with said foil sheet.

11. In combination with the pump of claim 1, a heating source on the side of said strip opposite said tube, and a sheet of metal foil interposed between said heating source and said strip, and being in heat-conductive contact with said heating source, said strip when in cooled position being in heat-conductive contact with said foil sheet.

12. In a motor lubrication system comprising a motor, a source of lubricating fluid, a pump, and fluid passage connections between said source and said motor via said pump; the improvement which comprises means sensitive to heat developed in the motor and effective to convert that heat into continued movement of an element in alternate operative directions, so long as heat is sensed in predetermined amount by said means, and an operative connection between said element and said pump for operating the latter in accordance with said alternate movement of the former.

13. The motor lubrication system of claim 2, in which said bimetal strip when in cooled position is in heat-conductive contact with said motor.

14. In the motor lubrication system of claim 2, a sheet of metal foil interposed between said motor and said bimetal strip.

15. In the motor lubrication system of claim 2, a sheet of metal foil interposed between said motor and said bimetal strip, said foil sheet being in heat-conductive contact with said motor and said bimetal strip when in cooled position being in heat-conductive contact with said foil sheet.

16. The motor lubrication system of claim 3, in which said bimetal strip when in cooled position is in heat-conductive contact with said motor.

17. In the motor lubrication system of claim 3, a sheet of metal foil interposed between said motor and said bimetal strip.

18. In the motor lubrication system of claim 3, a sheet of metal foil interposed between said motor and said bimetal strip, said foil sheet being in heat-conductive contact with said motor and said bimetal strip when in cooled position being in heat-conductive contact with said foil sheet.

References Cited in the file of this patent

UNITED STATES PATENTS

| | | |
|---|---|---|
| 1,739,944 | Braselton | Dec. 17, 1929 |
| 1,910,053 | Rainey | May 23, 1933 |
| 1,976,415 | Scott | Oct. 9, 1934 |
| 2,007,482 | Stitt | July 9, 1935 |
| 2,484,405 | Eskin | Oct. 11, 1949 |
| 2,572,162 | Koonz | Oct. 23, 1951 |
| 2,648,288 | Marks | Aug. 11, 1953 |
| 2,687,006 | Lyons | Aug. 24, 1954 |

FOREIGN PATENTS

| | | |
|---|---|---|
| 454,582 | Great Britain | Oct. 5, 1936 |